United States Patent [19]

Suga et al.

[11] Patent Number: 5,160,370
[45] Date of Patent: Nov. 3, 1992

[54] RECORDING LIQUID AND INK-JET RECORDING METHOD MAKING RECORDING UNIT, INK CARTRIDGE, AND INK-JET RECORDING APPARATUS MAKING USE THEREOF

[75] Inventors: Yuko Suga, Tokyo; Hiromichi Noguchi, Atsugi, both of Japan

[73] Assignee: Canon Kabushiki Kaisha, Tokyo, Japan

[21] Appl. No.: 700,949

[22] Filed: May 14, 1991

Related U.S. Application Data

[63] Continuation-in-part of Ser. No. 456,728, Dec. 26, 1989, abandoned.

Foreign Application Priority Data

Dec. 27, 1988 [JP] Japan ................ 63-331454
Dec. 27, 1988 [JP] Japan ................ 63-331455
Nov. 24, 1989 [JP] Japan ................ 1-305245

[51] Int. Cl.$^5$ ............................................. C09D 11/00
[52] U.S. Cl. ............................................. 106/20
[58] Field of Search ................................. 106/20

[56] References Cited

U.S. PATENT DOCUMENTS

| | | | |
|---|---|---|---|
| 4,021,252 | 5/1977 | Banczak et al. | 106/30 |
| 4,460,727 | 12/1989 | Shoji | 524/215 |
| 4,514,540 | 4/1985 | Peck | 106/27 |
| 4,597,794 | 7/1986 | Ohta et al. | 106/20 |
| 4,724,001 | 2/1988 | Ohta et al. | 106/22 |
| 4,765,838 | 8/1988 | Ohta et al. | 106/22 |
| 4,791,165 | 12/1988 | Bearss et al. | 524/516 |
| 4,804,411 | 2/1989 | Eida et al. | 106/22 |
| 4,841,037 | 6/1989 | Ohta et al. | 31/27 |
| 4,853,036 | 8/1989 | Koike | 106/20 |
| 4,864,324 | 9/1989 | Shirota et al. | 346/1.1 |

FOREIGN PATENT DOCUMENTS 246271 11/1986 Japan.
072774 4/1987 Japan.

*Primary Examiner*—William R. Dixon, Jr.
*Assistant Examiner*—Margaret V. Einsmann
*Attorney, Agent, or Firm*—Fitzpatrick, Cella, Harper & Scinto

[57] ABSTRACT

A recording liquid including a pigment, a water-soluble resin, a water-soluble organic solvent, and water, wherein, of the water-soluble resin, water-soluble resin that is in the state of being dissolved in the recording liquid without being absorbed on the pigment is contained in an amount of not more than 2% by weight; and the water-soluble organic solvent comprises at least one of a polyhydric alcohol and an alkyl ether thereof, and an aliphatic monohydric alcohol. This recording liquid is used in an ink-jet recording method, recording unit, ink cartridge, and ink-jet recording apparatus.

9 Claims, 3 Drawing Sheets

RECORDING LIQUID AND INK-JET RECORDING METHOD MAKING RECORDING UNIT, INK CARTRIDGE, AND INK-JET RECORDING APPARATUS MAKING USE THEREOF

This application is a continuation-in-part of application Ser. No. 07/456,728 filed Dec. 26, 1989, now abandoned.

BACKGROUND OF THE INVENTION

1. Field of the Invention

The present invention relates particularly to a recording liquid suited to ink-jet printers. It also relates to an ink-jet recording method that makes a record by flying a recording liquid from an orifice of a recording head by the action of heat energy.

2. Related Background Art

Ink-jet recording systems are advantageous in that they make less noise at the time of recording, can be readily matched to color recording, and also can obtain a recorded image with a high resolution at a high speed using a highly integrated head.

In ink-jet recording systems, liquids used as ink are those comprising various water-soluble dyes dissolved in water or in a mixed solution of water and an organic solvent. When, however, the water-soluble dyes are used, the light-resistance of recorded images is often questioned because of these water-soluble dyes, which have a poor light-resistance by nature.

The water resistance is also often questioned because of the dye, which is water-soluble. More specifically, when recording images are wetted with rain, sweat, or water used for drinking or food, the recorded images may sometimes blur or disappear.

On the other hand, similar problems may also arise in writing materials such as ball-point pens, in which dyes are used. In order to solve such problems of light-resistance and water resistance, various water-based pigment inks used for writing materials have been proposed. For the purpose of putting the water-based pigment inks into practical use, it has been studied to assure their dispersion stability, prevention of ink from solidifying at pen points, and prevention of balls of the ball-point pens from wearing.

For example, Japanese Patent Application Laid-Open No. 61-246271 disclosed an ink composition used for writing implements, which has improved dispersion stability and drying resistance by the use of a water-soluble amine salt, ammonium salt or metal salt of a co-polymer composed of a hydrophilic addition-polymerizable monomer as a water-soluble resin and a styrene and/or styrene derivative monomer. Japanese Patent Application Laid-Open No. 62-72774 discloses a water-based pigment ink used for ball-point pens which is made free from the ejection-down phenomenon and the ink-off phenomenon by the use of polysiloxane.

These, however, have had the disadvantage that they cause serious difficulties in ejection stability when used in ink-jet recording systems that record by propelling the conventional water-based pigment ink used for writing materials from an orifice of a recording head by the action of heat energy.

Some of the conventional water-based pigment inks can exhibit excellent ejection performance in their ejection for a relatively short time, but cause the problem that the ejection becomes unstable and no ejection may result at length when the driving conditions of a recording head are varied or ink is continuously ejected for a long period of time.

SUMMARY OF THE INVENTION

Accordingly, an object of the present invention is to eliminate the problems involved in the above described prior inks and to provide a recording liquid that enables always stable ejection even under variations of driving conditions or use for a long period of time.

Another object of the present invention is to provide a recording liquid that can give an image with superior waterfastness and lightfastness.

The present invention provides a recording liquid comprising a pigment, a water-soluble resin, a water-soluble organic solvent, and water, wherein:

of the water-soluble resin, water-soluble resin that is dissolved in the recording liquid without being absorbed on the pigment is contained in an amount of not more than 2% by weight; and the water-soluble organic solvent comprises at least one of a polyhydric alcohol and an alkyl ether thereof, and an aliphatic monohydric alcohol.

The present invention also provides an ink-jet recording method comprising applying heat energy to a recording liquid and forcing the recording liquid to be ejected from a minute orifice in the form of droplets; said recording liquid comprising a pigment, a water-soluble resin, a water-soluble organic solvent, and water, wherein:

of the water-soluble resin, water-soluble resin dissolved is present in an amount of not more than 2% by weight; and the water-soluble organic solvent comprises (i) an aliphatic monohydric alcohol, and (ii) at least one of a polyhydric alcohol and an alkyl ether thereof.

DETAILED DESCRIPTION OF THE PREFERRED EMBODIMENTS

Figure 1A:
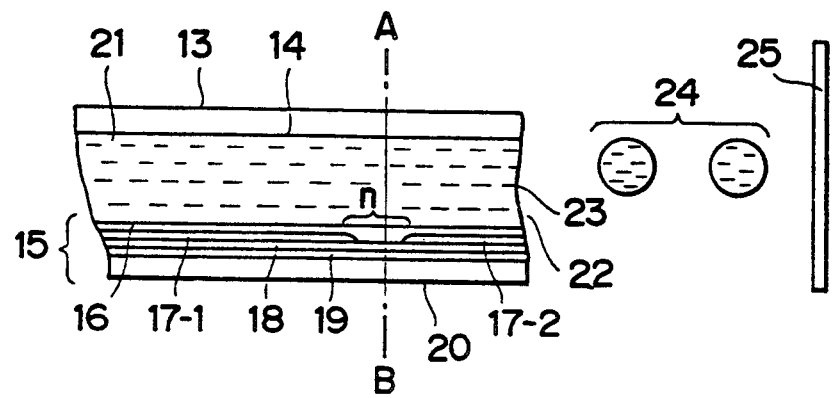
FIG. 1A and FIG. 1B are respectively a longitudinal cross-sectional view and a lateral cross-sectional view of a head portion of an ink-jet recording apparatus.

The recording liquid of the present invention has the properties particularly suited to ink-jet printers that use heat energy.

An ink-jet recording system that used heat energy utilizes as an ejection energy source a foaming phenomenon caused by the film boiling of the recording liquid on a thin-film heat generating resistance element, and has been put into practical use by the use of an ink in which a dye is used.

In this system, though for a time as very short as from $3\mu$ sec to $12\mu$ sec per signal, the ink layer on the thin-film heat generating resistance element is presumed to reach a temperature of from 200° C. to 300° C. or higher than that as a maximum temperature. Thus, the thermal stability of ink is a very important factor for imparting ejection stability.

The present inventors have investigated into the causes that bring about serious ejection troubles when the pigment inks as proposed for use in writing materials are used as they are, in the ink-jet recording that utilizes the heat energy. As a result, they found several factors. One of them is that the applying of a pulse to such inks used for writing materials results in the formation of deposits on the thin-film heat generating resistance element by the action of its heat to make the foaming of ink incomplete, so that ejection irregularity or non-ejection may occur. In another instance, ejection of droplets can not respond to the applied pulses because of incomplete foaming and hence non-ejection occurs. Namely, in order to force the ink to be stably ejected from nozzle tips, the ink must have the performances that it is foamed with the desired volume on the thin-film heat generating resistance element and, in addition, the foaming and defoaming can be repeated in the desired time. The conventional inks used for writing materials, however, do not satisfy these performances, so that the various difficulties as mentioned above may occur when they are put in an ink-jet recording apparatus to carry out recording.

Accordingly, the present inventors made intensive studies on the performance of inks belonging to the water-based pigment ink, thermally stable, and capable of achieving optimum foaming. As a result, they discovered that the water-soluble resin dissolved, contained in a recording liquid, may be controlled to be in an amount of not more than 2% by weight, and preferably not more than 1% by weight, and also a polyhydric alcohol and/or an alkyl ether thereof and an aliphatic monohydric alcohol may be used in combination as an water-soluble organic solvent, whereby the ink can be formed correctly on the thin-film heat generating resistance element under any driving conditions, and moreover may cause no formation of deposits on the thin-film heat generating resistance element even with its use over a long period of time and can be always stably ejected. The present invention has been thus accomplished.

The "water-soluble resin dissolved", as mentioned in the present invention, refers to the resin that dissolved in a liquid medium without being adsorbed on the pigment in the recording liquid.

The present invention will now be described below in detail.

All known organic pigments and inorganic pigments can be used as the pigment used in the present invention. They include, for example, azo pigments such as azo lakes, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes, and acid dye lakes; organic pigments such as nitro pigments, nitroso pigments, aniline black, daylight fluorescent pigments; and inorganic pigments such as titanium oxide, iron oxides, and carbon black. Even pigments not described in Color Index can all be used so long as they are dispersible in aqueous mediums.

The amount of the pigments to be contained may vary depending on the structure, but they may commonly be used in an amount ranging from 3 to 20% by weight, and preferably from 3 to 12% by weight, in weight ratio based on the recording liquid.

Water-soluble resins used in dispersion of pigments can be used as dispersants. The water-soluble resin to be used may preferably be a resin having an acid value of from 50 to 300, and more preferably from 70 to 250.

Since the pigment and the water-soluble resin are bonded through hydrophobic bonding, an excessively large acid value (i.e., excessively strong hydrophilic property) of the resin may bring about no intended adsorption of the resin onto the surface of the pigment, resulting in a large unadsorbed resin content in a pigment solution. On the other hand, an excessively small acid value (i.e., excessively low hydrophilic property) of the resin may result in no dissolution of the resin into water. The acid value of the resin, referred to in the present invention, is represented by the number of milligrams of KOH required to neutralize the resin.

The resin that can be specifically used includes any of those soluble in an aqueous solution in which an amine has been dissolved, as exemplified by natural polymers such as lignin sulfonate and shellac, and anionic polymers such as a polyacrylic acid, a styrene/acrylic acid copolymer, a styrene/acrylic acid/alkyl acrylate copolymer, a styrene/maleic acid copolymer, a styrene/maleic acid/alkyl acrylate copolymer, a styrene/methacrylic acid copolymer, a styrene/methacrylic acid/alkyl arylate copolymer, a styrene/maleic acid half ester copolymer, a vinylnaphthalene/acrylic acid copolymer, a vinylnaphthalene/maleic acid copolymer, or salts of these, and a sodium salt or phosphate of a $\beta$-naphthalenesulfonic acid formalin condensate.

The amount of these water-soluble resins to be contained may vary depending on the types of the pigment and water-soluble resin used, but may be the amount that makes not more than 2% by weight, and preferably not more than 1% by weight, the amount of the water-soluble resin not adsorbed on the pigment in the recording liquid. Preferred is the amount that may give a ratio of the pigment to the water-soluble resin, of from 3:2 to 10:1, preferably from 3:1 to 10:1, and more preferably from 10:3 to 10:1, in weight ratio.

The polyhydric alcohol and/or an alkyl ether thereof employed in the present invention includes polyalkylene glycols such as polyethylene glycol, and polypropylene glycol; alkylene glycols whose alkylene group has 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; and lower alkyl ethers of polyhydric alcohols, such as ethylene glycol monomethyl or monoethyl ether, diethylene glycol methyl or ethyl ether, and triethylene glycol monomethyl or monoethyl ether.

These polyhydric alcohols and/or alkyl ethers thereof may be contained in an amount ranging from 10 to 50% by weight, and preferably from 20 to 40% by weight. An amount thereof less than 10% by weight is not enough to prevent clogging at the nozzle tips, and an amount more than 50% by weight may result in a lowering of the print quality level of the resulting prints.

The aliphatic monohydric alcohol includes, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, and isobutyl alcohol.

Of these, ethyl alcohol is particularly preferred because of its capability of greatly improving the ejection stability of the recording liquid.

The aliphatic monohydric alcohol may be contained in an amount ranging from 3 to 15% by weight, and preferably from 3 to 10% by weight. An amount less than 3% by weight may make it impossible to achieve always stable ejection against variations of driving conditions of a printer. An amount more than 15% by weight tends to result in impairment of the print quality level of the resulting prints.

The water may be contained in an amount ranging from 10 to 60% by weight, and preferably from 10 to 50% by weight.

The main components that constitute the recording liquid of the present invention are as described above. Besides these, however, water-soluble organic solvents, surface active agents, pH adjusters, antiseptic agents, etc. may be optionally used.

The water-soluble organic solvents that can be used include amides such as dimethylformamide, and dimethylacetamide; ketones or ketoalcohols such as acetone, and diacetone alcohol; ethers such as tetrahydrofuran, and dioxane; N-methyl-2-pyrrolidone, and 1,3-dimethyl-2-imidazolidinone.

The surface active agents include anionic surface active agents such as aliphatic acid salts, higher alcohol phosphoric acid esters or salts, liquid fatty-oil sulfuric acid esters or salts, and alkylallylsulfonates; and non-ionic surface active agents such as polyoxyethylene alkyl ethers, polyoxyethylene alkyl esters, and polyoxyethylene sorbitan alkyl esters. These can be used by appropriately selecting one or more kinds. These should be used in an amount, though variable depending on the dispersant, of from 0.01 to 5% by weight based on the total weight of the ink. Here, the amount of the surface active agent to be added may preferably be selected so that the surface tension of the recording liquid may be not less than 35 dyne/cm. This is because a recording liquid with a surface tension showing a value smaller than this may cause an undesirable situation such that prints are distorted (the dots resulting from the shot of recording liquid droplets are deviated on a recording paper) because of the wetting of nozzle tips.

The pH adjusters include, for example, all sorts of organic amines such as diethanol amine, and triethanol amine; inorganic alkali agents such as alkali metal hydroxides as exemplified by sodium hydroxide, lithium hydroxide, and potassium hydroxide; organic acids, and mineral acids.

The recording liquid of the present invention can be prepared by first adding the pigment in an aqueous solution containing at least the dispersion resin, amine, and water, stirring the mixture, and thereafter carrying out dispersion using the dispersion means as described later, optionally followed by centrifugal separation to give a desired dispersion. Next, the components as set forth in the above are added in this dispersion, which is then stirred to make up a recording liquid.

In order to prepare the unadsorbed resin to be in the amount not more than 2%, it is necessary for the aqueous solution containing the resin, amine and water to be stirred at 60° C. or more for 30 minutes or more until the resin is beforehand completely dissolved.

It is also necessary for the amine used for dissolving the resin, to be added in an amount not less than 1.2 times the amount of amine determined by calculation from the acid value of the resin. This amount of amine can be determined by the following equation:

$$\text{Amount of amine} = \frac{\text{Acid value of resin} \times \text{molecular weight of amine} \times \text{resin weight (g)}}{56000}$$

Before putting the aqueous solution containing the pigment into dispersion, it is further necessary to carry out pre-mixing for 30 minutes or more.

This pre-mixing improves the wettability of the surface of the pigment to promote the adsorption of the resin onto the surface of the pigment.

The amines added in the dispersion may preferably include organic amines such as monoethanolamine, diethanolamine, triethanolamine, aminomethylpropanol, and ammonia.

As for the dispersion means, any dispersion machine commonly used may be used, including, for example, a ball mill, a roll mill, and a sand mill.

Of these, a sand mill of a high-speed type is preferred, including, for example, Super Mill, Sand Grinder, Beads Mill, Agitator Mill, Grain Mill, Daino Mill, Pearl Mill, and Cobol Mill (which are all trade names).

In the present invention, the pigment having the desired particle size can be obtained by using a method in which the grinding media of the dispersion machine are made small in size, the grinding media are made large in packing, the grinding is carried out for a longer time, the particles are discharged at a lower rate, or the particles are classified using a filter or a centrifugal separator after they are ground. These methods can also be used in combination.

The amount of the unadsorbed resin according to the present invention can be measured by preferably using a method in which the pigment content and the content of the resin adsorbed on the pigment are precipitated using an ultracentrifuge or the like, and the amount of residual resin contained in the resulting supernatant liquid is measured using a TOC (total organic carbon) meter or by the weight method (a method in which the supernatant is evaporated to dryness and the resin weight is measured).

The recording liquid of the present invention is particularly preferably used in the ink-jet recording system that makes a record by ejecting droplets by the action of heat energy. Needless to say, however, it can also be used as inks for usual writing implements.

The methods and the apparatus suitable for the use of the ink of the present invention are those which provide thermal energy to ink in a cell in a recording head that corresponds with recording signals to form liquid droplets by the thermal energy.

Figure 1B:
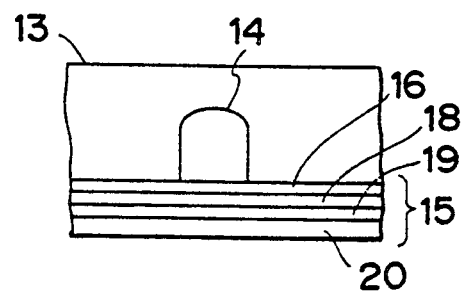
Figure 2:
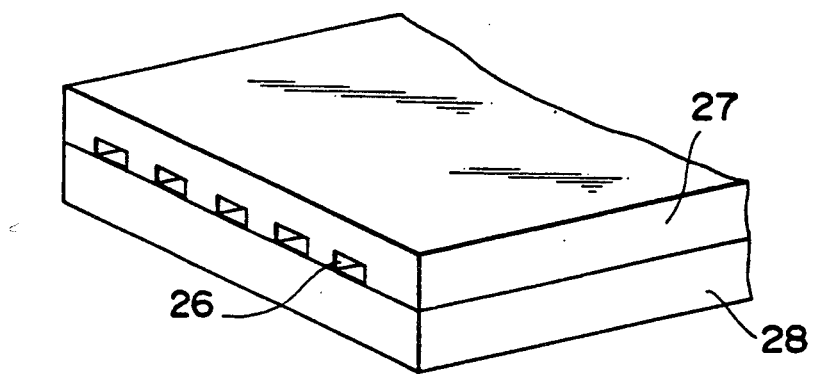
FIG. 2 is an oblique view of a multiple form of the head of FIG. 1.

An example of the constitution of the heads, which is a main portion of the apparatus, is shown in FIG. 1A, FIG. 1B and FIG. 2.

A head 13 is formed by bonding a plate of glass, ceramics, or plastics having a groove 14 with a heat-generating head 15. The type of the head is not limited to the one shown in the figure. The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having a good heat-releasing property made of alumina or the like.

Ink 21 reaches the ejection orifice 22 (a fine pore), forming a meniscus 23 by action of pressure P not shown in the figure.

On application of an electric signal to the electrodes 17-1 and 17-2, the region designated by a symbol "n" on the heat-generating head 15 abruptly generates heat to form a bubble in the ink 21 at the position adjacent thereto. The pressure generated by the bubble pushes out the meniscus 23 and ejects the ink 21, as recording droplets 24, and the ink droplets fly to a recording medium 25. FIG. 2 illustrates an appearance of a multi-head constructed by juxtaposing a multiplicity of heads shown in FIG. 1A. The multi-head is prepared by bonding a glass plate having multi-grooves with a heat-generating head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
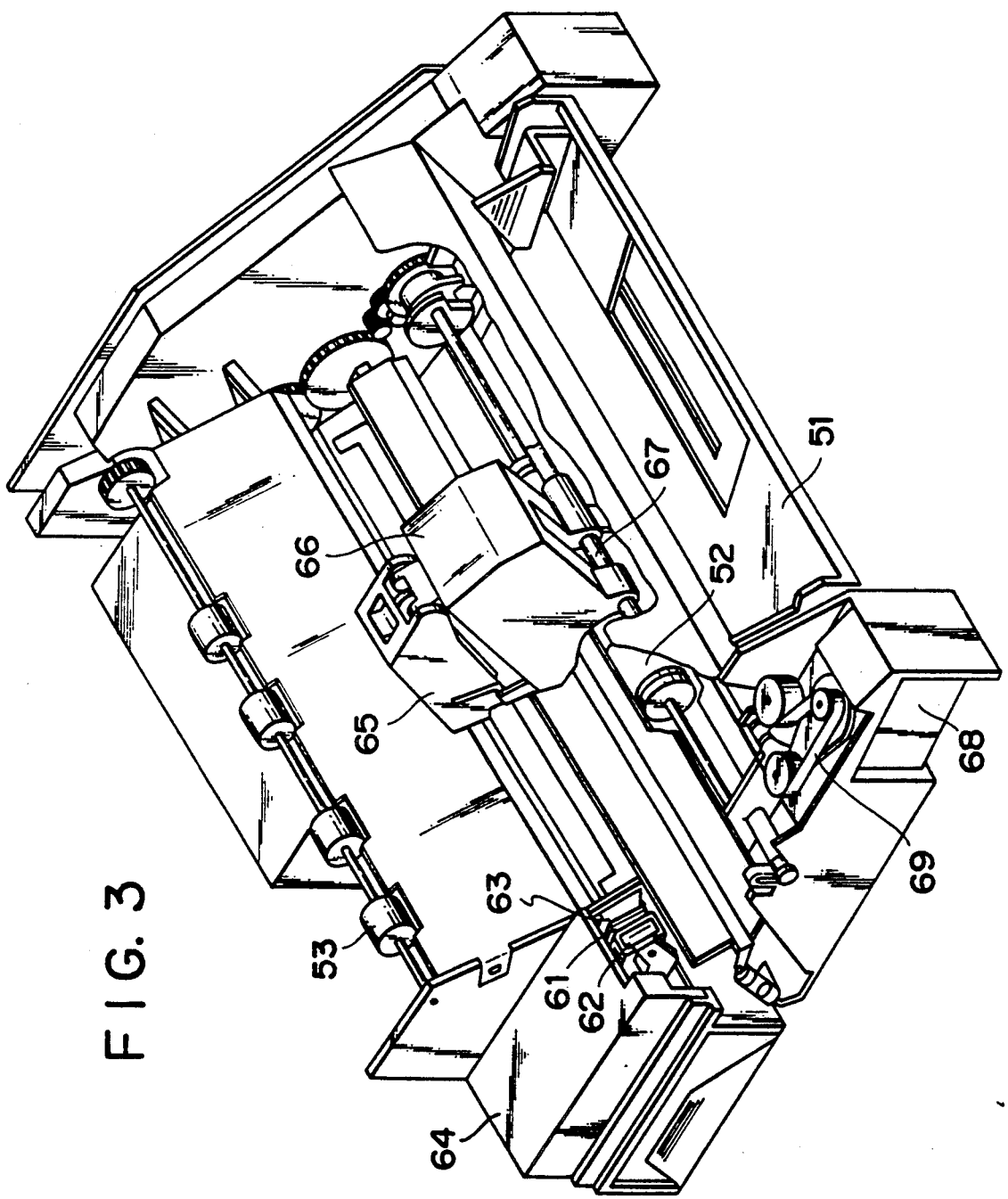
FIG. 3 is an oblique view of an ink-jet recording apparatus.

FIG. 3 illustrates an example of the ink-jet recording apparatus having such a head mounted therein.

In FIG. 3, a blade 61 as a wiping member is held at one end by a blade-holding member. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62 and the absorption member 63 constitute an ejection-recovery section 64, and the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slidable with a guide rod 67. A portion of the carriage 66 is connected (not shown in the figure) to a belt 69 driven by a motor 68, so that the carriage 66 is movable along the guide rod 67 to the recording region of the recording head and the adjacent region thereto.

The constitution of a paper delivery portion 51 for delivery of a recording medium and a paper delivery roller 52 driven by a motor (not shown) in the figure delivers the recording medium to the position opposing to the ejecting nozzle face of the recording head, and the recording medium is discharged with the progress of the recording to the paper discharge portion provided with paper-discharge rollers 53.

In the above constitution, the cap 62 of the ejection-recovery portion 64 is out of the moving path of the recording head 65, while the blade 61 is made to protrude into the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
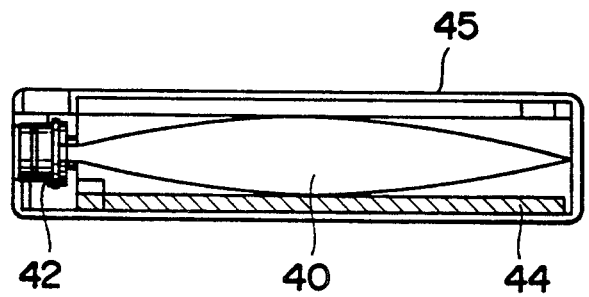
FIG. 4 is a longitudinal cross-sectional view of an ink cartridge.

FIG. 4. Illustrates an example of the ink cartridge 45 containing ink to be supplied through an ink supplying member, such as a tube (not shown). The ink container portion 40, for example an ink bag, contains an ink to be supplied, and has a rubber plug 42 at the tip. By inserting a needle (not shown in the figure) into the plug 42, the ink in the ink container portion 40 is accessible. An absorption member 44 absorbs waste ink.

The ink container portion has preferably a liquid-contacting face made of polyolefin, especially polyethylene in the present invention.

The ink-jet recording apparatus used in the present invention is not limited to the above-mentioned one which has separately a head and an ink cartridge. Integration thereof as shown in FIG. 5 may suitably be used.

Figure 5:
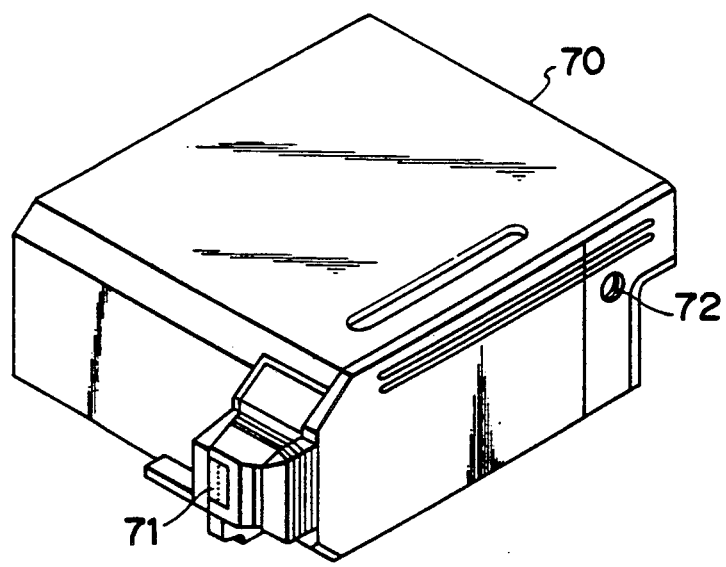
FIG. 5 is an oblique view of a recording unit.

In FIG. 5, a recording unit 70 houses an ink container portion such as an ink absorption member, and the ink in the ink absorption member is ejected from a head 71 having a plurality of orifices. The material for the ink absorption member is preferably polyurethane in the present invention.

Air-communication opening 72 is provided to communicate the interior of the cartridge with the open air.

The recording unit 70 may be used in place of the recording head shown in FIG. 3, and is readily mountable to and demountable from the carriage 66.

EXAMPLES

The present invention will now be described in greater detail by giving Examples and Comparative Examples below. In the following, "part(s)" is by part(s) by weight.

EXAMPLE 1

(Preparation of pigment dispersion)

| | |
|---|---|
| Styrene/acrylic acid/ethyl acrylate copolymer (acid value: 174; average molecular weight: 18000) | 5 parts |
| Monoethanolamine | 1.5 parts |
| Ion-exchanged water | 68.5 parts |
| Ethylene glycol | 5 parts |

The above components were mixed. The mixture was heated to 70° C. using a water bath, and the resin content was completely dissolved. Here, an excessively low concentration of the resin to be dissolved may sometimes result in incomplete dissolution, and therefore, when the resin is dispersed, a highly concentrated solution may be previously prepared and the solution may be diluted to give the desired resin solution. In this solution, 15 parts of carbon black (MCF-88, a product of Mitsubishi Chemical Industries Limited) and 5 parts of ethanol were added. Pre-mixing was carried out for 30 minutes, followed by dispersion under the following conditions:

Dispersion machine: Sand Grinder (manufactured by Igarashi Kikai Co.)
Grinding media: Zirconium beads of 1 mm in diameter
Packing of grinding media: 50% (volume
Grinding time: 3 hours
Centrifugal separation (at 12000 rpm for 20 minutes) was further carried out, and then coarse particles were removed to give a dispersion.

Preparation of ink

| | |
|---|---|
| The above dispersion | 50 parts |
| Glycerol | 8 parts |
| Ethylene glycol | 10 parts |
| Ethanol | 4 parts |
| Ion-exchanged water | 28 parts |

The above components were mixed, and the resulting mixture was stirred for 1 hour to give an ink.

EXAMPLE 2

Preparation of Pigment Dispersion

| | |
|---|---|
| Styrene/maleic acid half ester/maleic anhydride copolymer (acid value: 155; average molecular weight: 13000) | 6 parts |
| Aminomethylpropanol | 2.5 parts |
| Ion-exchanged water | 59.5 parts |
| Diethylene glycol | 5 parts |

The above components were mixed. The mixture was heated to 70° C. using a water bath, and the resin content was completely dissolved. In this solution, 20 parts of carbon black (#1000, a product of Mitsubishi Chemical Industries Limited) and 7 parts of ethanol were added. Pre-mixing was carried out for 30 minutes, followed by dispersion under the following conditions:

Dispersion machine: Pearl Mill (manufactured by Ashizawa Co.)
Grinding media: Glass beads of 1 mm in diameter
Packing of grinding media: 50% (volume)
Discharge rate: 100 mo/min
Centrifugal separation (at 12000 rpm for 20 minutes) was further carried out, and then coarse particles were removed to give a dispersion.

Preparation of Ink

| | |
|---|---|
| Above dispersion | 40 parts |
| Glycerol | 10 parts |
| Ethylene glycol | 5 parts |
| Ethanol | 5 parts |
| Ion-exchanged water | 40 parts |

The above components were mixed, and the resulting mixture was stirred for 1 hour to give an ink.

EXAMPLE 3

Preparation of Pigment Dispersion

| | |
|---|---|
| Styrene/maleic acid half ester/maleic anhydride copolymer (acid value: 205; average molecular weight: 7000) | 8 parts |
| Aminomethylpropanol | 4 parts |
| Ion-exchanged water | 56 parts |
| Diethylene glycol | 5 parts |

The above components were mixed. The mixture was heated to 70° C. using a water bath, and the resin content was completely dissolved. In this solution, 20 parts of carbon black (SB6, a product of Degussa Co. Ltd.) and 7 parts of ethanol were added. Pre-mixing was carried out for 30 minutes, followed by dispersion under the following conditions:

Dispersion machine: Pearl Mill (manufactured by Ashizawa Co.)
Grinding media: Glass beads of 1 mm in diameter
Packing of grinding media: 50% (volume)
Discharge rate: 100 mo/min
Centrifugal separation (at 12000 rpm for 20 minutes) was further carried out, and then coarse particles were removed to give a dispersion.

Preparation of Ink

| | |
|---|---|
| Above dispersion | 40 parts |
| Glycerol | 6 parts |
| Ethylene glycol | 10 parts |
| Ethanol | 5 parts |
| Ion-exchanged water | 39 parts |

The above components were mixed, and the resulting mixture was stirred for 1 hour to give an ink.

EXAMPLE 4

Preparation of Pigment Dispersion

| | |
|---|---|
| Styrene/acrylic acid/butyl acrylate copolymer (acid value: 137; average molecular weight: 11400) | 6 parts |
| Monoethanolamine | 3 parts |
| Ion-exchanged water | 66 parts |
| Ethylene glycol | 5 parts |

The above components were mixed. The mixture was heated to 70° using a water bath, and the resin content was completely dissolved. In this solution, 15 parts of copper phthalocyanine blue (Heliogen Blue D6700T, a product of BASF) and 5 parts of ethanol were added. Pre-mixing was carried out for 30 minutes, followed by dispersion under the following conditions:

Dispersion machine: Sand Grinder (manufactured by Igarashi Kikai Co.)
Grinding media: Zirconium beads of 1 mm in diameter
Packing of grinding media: 50% (volume)
Grinding time: 3 hours
Centrifugal separation (at 12000 rpm for 20 minutes) was further carried out, and then coarse particles were removed to give a dispersion.

Preparation of Ink

| | |
|---|---|
| The above dispersion | 40 parts |
| Ethylene glycol | 20 parts |
| Ethanol | 4 parts |
| Ion-exchanged water | 36 parts |

The above components were mixed, and the resulting mixture was stirred for 1 hour to give an ink.

COMPARATIVE EXAMPLE 1

Example 1 was repeated to give an ink, except that the water-soluble resin, monoethanolamine, and ion-exchanged water contained in the pigment dispersion were used in amounts of 15 parts, 4.5 parts, and 57 parts, respectively.

COMPARATIVE EXAMPLE 2

Example 2 was repeated to give an ink, except that the water-soluble resin, aminomethylpropanol, and ion-exchanged water contained in the pigment dispersion were used in amounts of 15 parts, 6 parts, and 49 parts, respectively.

COMPARATIVE EXAMPLE 3

Example 3 was repeated to give an ink, except that the water-soluble resin, monoethanolamine, and ion-exchanged water contained in the pigment dispersion were used in amounts of 15 parts, 3 parts, and 52 parts, respectively.

COMPARATIVE EXAMPLE 4

Example 1 was repeated to give an ink, except that the ethanol was not used in the ink and the water was increased by the amount corresponding thereto.

Using the above recording liquids, evaluation was made on the following items. As printers, here were used (A) a think jet printer (manufactured by HP Co.; drive frequency: 1.2 kHz), (B) a desk jet printer (manufactured by HP Co.; drive frequency: 3.6 kHz), and (C) a modified printer of BJ-130 (manufactured by Canon Inc.), which are of the type the ink is ejected by applying heat energy.

T1: Driving conditions and ejection stability:

Printer (C) is set at a drive voltage of 25 V, 27 V, or 30 V, and printing is carried out at room temperature under conditions of two types of 2 kHz and 4 kHz for each voltage. Whether or not there are print irregularity, print-off, non-ejection, etc. is observed to make evaluation of ejection stability.

AA: Ink is ejected to give a regular or orderly print from the first-character printing, and non-ejection, print-off, and print irregularity are not seen at all in the course of continuous printing.

A: Ink is ejected to give a regular or orderly print at the part of characters, but non-ejection is recognized at several spots at the part of solid printing.

B: Non-ejection occurs even at the part of characters after continuous printing of several characters.

C. Serious ejection irregularity occurs at the first print of a character, and the prints were illegible at all.

T0: Residual resin concentration:

The resulting inks are each centrifuged at 55000 rpm for 5 hours using an ultra-high cooling centrifuge (manufactured by Beckman Instruments, Inc.) so that the pigment content and the content of the resin adsorbed on the pigment are precipitated. Thereafter, the supernatant liquid is collected in a given quantity, and is dried into a solid by means of a vacuum dryer (60° C., 24 hours). The percentage of this resin weight to the charge ink is calculated to find residual resin concentration.

Results obtained are shown in Table 1.

TABLE 1

| Sample | | | Test: T1 Printer | | | | | | TO (% wt.) |
|---|---|---|---|---|---|---|---|---|---|
| | | | (C) | | | | | | |
| | | | 2kHz | | | 4kHz | | | |
| | (A) | (B) | 25V | 27V | 30V | 25V | 27V | 30V | |
| Example: | | | | | | | | | |
| 1 | AA | AA | AA | AA | AA | AA | AA | AA | 0.2 |
| 2 | AA | AA | AA | AA | AA | AA | AA | AA | 0.1 |
| 3 | AA | AA | AA | AA | AA | AA | AA | AA | 0.3 |
| 4 | AA | AA | AA | AA | AA | AA | AA | AA | 0.05 |
| Comparative Example: | | | | | | | | | |
| 1 | B | C | C | C | B | C | C | C | 4.5 |
| 2 | C | C | C | C | B | C | C | C | 3.4 |
| 3 | B | C | C | C | B | C | C | C | 2.9 |
| 4 | A | B | C | C | B | C | B | B | 0.2 |

EXAMPLE 5

The recording liquid obtained in Examples 1 to 4 were each filled in a commercially available felt pen, and writing was made on a wood-free paper (GINWA, a tradename, available from Sanyo-Kokusaku Pulp Co., Ltd.). As a result, it was possible to smoothly write without any uneven flow of ink.

It was also possible to smoothly write even in writing after the pen was left uncapped for 24 hours.

EXAMPLE 6

Preparation of Pigment Dispersion

| | |
|---|---|
| Styrene/acrylic acid/ethyl acrylate copolymer (acid value: 174; average molecular weight: 18000 | 2 parts |
| Monoethanolamine | 0.5 parts |
| Ion-exchanged water | 77.5 parts |
| Ethylene glycol | 5 parts |

The above components were mixed. The mixture was heated to 70° C. using a water bath, and the resin content was completely dissolved. Here, an excessively low concentration of the resin to be dissolved may sometimes result in incomplete dissolution, and therefore, when the resin is dispersed, a highly concentrated solution may be previously prepared and the solution may be diluted to give the desired resin solution. In this solution, 10 parts of carbon black (MCF-88, a product of Mitsubishi Chemical Industries Limited) and 5 parts of ethanol were added. Pre-mixing was carried out for 30 minutes, followed by dispersion under the following conditions:

Dispersion machine: Sand Grinder (manufactured by Igarashi Kikai Co.)
Grinding media: Zirconium beads of 1 mm in diameter
Packing of grinding media: 50% (volume)
Grinding time: 3 hours
Centrifugal separation (at 12000 rpm for 20 minutes) was further carried out, and then coarse particles were removed to give a dispersion.

Preparation of Ink

| | |
|---|---|
| Above dispersion | 50 parts |
| Glycerol | 8 parts |
| Ethylene glycol | 10 parts |
| Ethanol | 4 parts |
| Ion-exchanged water | 28 parts |

The above components were mixed, and the resulting mixture was stirred for 1 hour to give an ink.

EXAMPLE 7

Preparation of Pigment Dispersion

| | |
|---|---|
| Acrylic acid/butyl acrylate/methyl methacrylate copolymer (acid value: 80; average molecular weight 6700) | 4.5 parts |
| Monoethanolamine | 1 part |
| Ion-exchanged water | 69 parts |
| Ethylene glycol | 5 parts |

The above components were mixed. The mixture was heated to 70° C. using a water bath, and the resin content was completely dissolved. In this solution, 15 parts of carbon black (MCF-88, a product of Mitsubishi Chemical Industries Limited) and 5 parts of ethanol were added. Pre-mixing was carried out for 30 minutes, followed by dispersion under the following conditions:
Dispersion machine: Sand Grinder (manufactured by Igarashi Kikai Co.)
Grinding media: Glass beads of 1 mm in diameter
Packing of grinding media: 60% (volume)
Grinding time: 3 hours
Centrifugal separation (at 20000 rpm for 20 minutes) was further carried out, and then coarse particles were removed to give a dispersion.

Preparation of Ink

| Above dispersion | 40 parts |
|---|---|
| Thiodiglycol | 10 parts |
| Ethylene glycol | 10 parts |
| Ethanol | 4 parts |
| Ion-exchanged water | 36 parts |

The above components were mixed, and the resulting mixture was stirred for 1 hour to give an ink.

EXAMPLE 8

Preparation of Pigment Dispersion

| Styrene/maleic acid half ester/maleic anhydride copolymer (acid value: 155; average molecular weight 13000) | 2 parts |
|---|---|
| Aminomethylpropanol | 1 part |
| Ion-exchanged water | 67 parts |
| Diethylene glycol | 5 parts |

The above components were mixed. The mixture was heated to 70° C. using a water bath, and the resin content was completely dissolved. In this solution, 15 parts of carbon black (MCF-88, a product of Mitsubishi Chemical Industries Limited) and 7 parts of ethanol were added. Pre-mixing was carried out for 30 minutes, followed by dispersion under the following conditions:
Dispersion machine: Pearl Mill (manufactured by Ashizawa Co.)
Grinding media: Glass beads of 1 mm in diameter
Packing of grinding media: 50% (volume)
Discharge rate: 100 mo/min
Centrifugal separation (at 12000 rpm for 20 minutes) was further carried out, and then coarse particles were removed to give a dispersion.

Preparation of Ink

| Above dispersion | 40 parts |
|---|---|
| Glycerol | 10 parts |
| Ethylene glycol | 5 parts |
| Ethanol | 5 parts |
| Ion-exchanged water | 40 parts |

The above components were mixed, and the resulting mixture was stirred for 1 hour to give an ink.

EXAMPLE 9

Preparation of Pigment Dispersion

| Styrene/maleic acid half ester/maleic anhydride copolymer (acid value: 205; average molecular weight: 7000) | 3 parts |
|---|---|
| Aminomethylpropanol | 1.5 parts |
| Ion-exchanged water | 71.5 parts |
| Diethylene glycol | 5 parts |

The above components were mixed. The mixture was heated to 70° C. using a water bath, and the resin content was completely dissolved. In this solution, 12 parts of carbon black (MCF-88, a product of Mitsubishi Chemical Industries Limited.) and 7 parts of ethanol were added. Pre-mixing was carried out for 30 minutes, followed by dispersion under the following conditions:
Dispersion machine: Pearl Mill (manufactured by Ashizawa Co.)
Grinding media: Glass beads of 1 mm in diameter
Packing of grinding media: 50% (volume)
Discharge rate: 100 mo/min
Centrifugal separation (at 12000 rpm for 20 minutes) was further carried out, and then coarse particles were removed to give a dispersion.

Preparation of Ink

| Above dispersion | 40 parts |
|---|---|
| Glycerol | 6 parts |
| Ethylene glycol | 10 parts |
| Ethanol | 5 parts |
| Ion-exchanged water | 39 parts |

The above components were mixed, and the resulting mixture was stirred for 1 hour to give an ink.

EXAMPLE 10

Preparation of Pigment Dispersion

| Styrene/acrylic acid/butyl acrylate copolymer (acid value: 137; average molecular weight: 11400) | 2 parts |
|---|---|
| Monoethanolamine | 0.5 parts |
| Ion-exchanged water | 72.5 parts |
| Ethylene glycol | 5 parts |

The above components were mixed. The mixture was heated to 70° C. using a water bath, and the resin content was completely dissolved. In this solution, 15 parts of carbon black (#1000, a product of Mitsubishi Chemical Industries Limited) and 5 parts of ethanol were added. Pre-mixing was carried out for 30 minutes, followed by dispersion under the following conditions:
Dispersion machine: Sand Grinder (manufactured by Igarashi Kikai Co.)
Grinding media: Zirconium beads of 1 mm in diameter
Packing of grinding media: 50% (volume)
Grinding time: 3 hours
Centrifugal separation (at 12000 rpm for 20 minutes) was further carried out, and then coarse particles were removed to give a dispersion.

Preparation of Ink

| The above dispersion | 40 parts |
|---|---|
| Ethylene glycol | 20 parts |
| Ethanol | 4 parts |
| Ion-exchanged water | 36 parts |

The above components were mixed, and the resulting mixture was stirred for 1 hour to give an ink.

EXAMPLE 11

Preparation of Pigment Dispersion

| | |
|---|---|
| Styrene/maleic acid half ester/maleic anhydride copolymer (acid value: 193; average molecular weight: 28000) | 6 parts |
| Monoethanolamine | 2 parts |
| Ion-exchanged water | 59 parts |
| Ethylene glycol | 5 parts |

The above components were mixed. The mixture was heated to 70° C. using a water bath, and the resin content was completely dissolved. In this solution, 20 parts of carbon black (MA100, a product of Mitsubishi Chemical Industries Limited) and 8 parts of ethanol were added. Pre-mixing was carried out for 30 minutes, followed by dispersion under the following conditions:

Dispersion machine: Sand Grinder (manufactured by Igarashi Kikai Co.)
Grinding media: Zirconium beads of 1 mm in diameter
Packing of grinding media: 50% (volume)
Grinding time: 3 hours Centrifugal separation (at 12000 rpm for 20 minutes) was further carried out, and then coarse particles were removed to give a dispersion.

Preparation of Ink

| | |
|---|---|
| The above dispersion | 20 parts |
| Ethylene glycol | 10 parts |
| Thiodiglycol | 6 parts |
| Ethanol | 4 parts |
| Ion-exchanged water | 60 parts |

The above components were mixed, and the resulting mixture was stirred for 1 hour to give an ink.

EXAMPLE 12

Example 6 was repeated to give an ink, except that the pigment contained in the dispersion was replaced with 10 parts of a phthalocyanine blue pigment (Lionel Green GYK; a product of Toyo Ink Mfg. Co., Ltd.) and the amount of ion-exchanged water was changed to 76.5 parts.

COMPARATIVE EXAMPLE 5

Example 6 was repeated to give an ink, except that the dispersion resin, monoethanolamine, and ion-exchanged water contained in the pigment dispersion were used in amounts of 7 parts, 1.5 parts, and 81.5 parts, respectively.

COMPARATIVE EXAMPLE 6

Example 7 was repeated to give an ink, except that the dispersion resin and ion-exchanged water contained in the pigment dispersion were used in amounts of 10 parts and 64 parts, respectively.

COMPARATIVE EXAMPLE 7

Example 8 was repeated to give an ink, except that the dispersion resin and ion-exchanged water contained in the pigment dispersion were used in amounts of 8 parts and 61 parts, respectively.

COMPARATIVE EXAMPLE 8

Example 6 was repeated to give an ink, except that the dispersion resin, monoethanolamine, and ion-exchanged water contained in the pigment dispersion were used in amounts of 10 parts, 2.5 parts, and 67.5 parts, respectively.

COMPARATIVE EXAMPLE 9

Example 6 was repeated to give an ink, except that the ethanol was not used in the ink and the water was increased by the amount corresponding thereto.

Using the above ink, evaluation was made in the same manner as in Example 1. The following items, however, were added for the evaluation.

T2: Clogging when the printing is started again after stopped for a while:

As to the clogging that may occur when the printing is started again after stopped for a while, judgement was made on whether or not there were any obscurity of characters or print-off when alphanumeric characters were continuously printed for 10 minutes using a printer filled with a given ink, the printing was thereafter stopped, the printer was left uncapped for 10 minutes, and then the alphanumeric characters were again printed. (Left at 20±5° C. and 50±10% RH; driving conditions of printer (C): 2 KHz, 30 V).

A: No defects occur from the first-character printing.

B: Partial obscurity or print-off occurs from the first-character printing.

C: The first character can not be printed at all.

T3: Restoration of clogging when the printing is started again after stopped for a long time:

Alphanumeric characters were continuously printed for 10 minutes using a printer filled with a given ink, the printing was thereafter stopped, the printer was left uncapped for 7 days, and then the restoration of clogging was operated. Judgement was made on how many times the operation had to be repeated until it became possible to carry out the printing without causing obscurity of characters or print-off. (Left at 60° C. and 10±5% RH; driving conditions of printer (C): 2 KHz, 30 V).

A: Normal printing became possible after the restoration was operated once to 5 times.

B: Normal printing became possible after the restoration was operated 6 to 9 times.

C: Normal printing became possible after the restoration was operated 11 times or more.

T4: Surface tension (CBVP A1 surface tensiometer; manufactured by Kyowa Kagaku Co.) and viscosity (VISCONIC ELD; manufactured by Tokyo Keiki Co.) were also measured.

Tests were carried out based on the above evaluation items. Results obtained are shown in Table 2.

TABLE 2

| Sample | (A) | (B) | T1 Printer (C) | | | | | | T2 | T3 | T4 Viscosity (cps) | Surface tension (dyne·cm) | TO (% wt.) |
|---|---|---|---|---|---|---|---|---|---|---|---|---|---|
| | | | 2kHz | | | 4kHz | | | | | | | |
| | | | 25V | 27V | 30V | 25V | 27V | 30V | | | | | |
| Example: | | | | | | | | | | | | | |
| 6 | AA | AA | AA | AA | AA | AA | AA | AA | A | A | 3.2 | 42.9 | 0.06 |
| 7 | AA | AA | AA | AA | AA | AA | AA | AA | A | A | 2.9 | 43.5 | 0.12 |
| 8 | AA | AA | AA | AA | AA | AA | AA | AA | A | A | 3.0 | 37.0 | 0.03 |
| 9 | AA | AA | AA | AA | AA | AA | AA | AA | A | A | 2.8 | 40.2 | 0.12 |
| 10 | AA | AA | AA | AA | AA | AA | AA | AA | A | A | 2.6 | 44.0 | 0.09 |
| 11 | AA | AA | AA | AA | AA | AA | AA | AA | A | A | 3.3 | 40.5 | 0.24 |
| 12 | AA | AA | AA | AA | AA | AA | AA | AA | A | A | 3.5 | 43.1 | 0.03 |
| Comparative Example: | | | | | | | | | | | | | |
| 5 | B | B | C | C | B | C | C | B | A | A | 4.0 | 40.4 | 2.3 |
| 6 | C | C | C | C | B | C | C | C | A | A | 3.6 | 40.5 | 3.1 |
| 7 | B | B | C | C | B | C | C | B | A | A | 4.5 | 35.5 | 2.2 |
| 8 | B | C | C | C | B | C | C | B | A | A | 5.5 | 39.5 | 2.8 |
| 9 | A | B | C | C | B | C | B | B | A | A | 3.2 | 44.2 | 0.06 |

EXAMPLE 13

The recording liquids obtained in Examples 6 to 12 were each filled in a commercially available felt pen, and writing was made on a wood-free paper (GINWA, a tradename, available from Sanyo-Kokusaku Pulp Co., Ltd.). As a result, it was possible to smoothly write without any uneven flow of ink.

It was also possible to smoothly write even in writing after the pen was left uncapped for 24 hours.

As having been described in the above, the present invention can provide a recording liquid suited to the recording apparatus equipped with various kinds of recording head and utilizing heat energy. It can also provide a recording method that can achieve high reliability and carry out printing at a high quality level.

We claim:

1. A recording liquid comprising a pigment, a water-soluble resin, a water-soluble organic solvent, and water, wherein;
   of the water-soluble resin, water-soluble resin that is dissolved in the recording liquid without being absorbed on the pigment is contained in an amount of not more than 2% by weight; and
   the water-soluble organic solvent comprises (i) an aliphatic monohydric alcohol, and (ii) at least one of a polyhydric alcohol and an alkyl ether thereof.

2. A recording liquid according to claim 1, wherein said aliphatic monohydric alcohol is ethyl alcohol.

3. A recording liquid according to claim 1, wherein said aliphatic monohydric alcohol is contained in an amount ranging from 3 to 15% by weight.

4. A recording liquid according to claim 1, wherein said at least one of a polyhydric alcohol and an alkyl ether thereof is contained in an amount ranging from 10 to 50% by weight.

5. A recording liquid comprising a pigment, a water-soluble resin, a water-soluble organic solvent, and water, wherein;
   of the water-soluble resin, water-soluble resin that is dissolved in the recording liquid without being absorbed on the pigment is contained in an amount of not more than 2% by weight; and
   the water-soluble organic solvent comprises (i) an aliphatic monohydric alcohol, and (ii) at least one of a polyhydric alcohol and an alkyl ether thereof; and the water-soluble resin has an acid value of from 50 to 300.

6. A recording liquid according to claim 5, wherein said aliphatic monohydric alcohol is ethyl alcohol.

7. A recording liquid according to claim 5, wherein said aliphatic monohydric alcohol is contained in an amount ranging from 3 to 15% by weight.

8. A recording liquid according to claim 5, wherein said at least one of a polyhydric alcohol and an alkyl ether thereof is contained in an amount ranging from 10 to 50% by weight.

9. A recording liquid according to claim 5, wherein said water-soluble resin has an acid value of 70 to 250.

* * * * *

UNITED STATES PATENT AND TRADEMARK OFFICE
CERTIFICATE OF CORRECTION

PATENT NO. : 5,160,370
DATED : November 3, 1992
INVENTOR(S) : Suga et al.

It is certified that error appears in the above-identified patent and that said Letters Patent is hereby corrected as shown below:

On the title page: Item [54] and Column 1, line 2,

"METHOD MAKING" should read --METHOD,--.

COLUMN 1:

Line 2, "METHOD MAKING" should read --METHOD--.

COLUMN 2:

Line 54, "used" should read --uses--.

COLUMN 3:

Line 40, "that" should read --that is--.

COLUMN 8:

Line 1, "Illustrates" should read --illustrates--;
Line 18, "in" should read --In--; and
Line 64, "(volume" should read --(volume)--.

COLUMN 9:

Line 34, "mo/min" should read --ml/min--.

UNITED STATES PATENT AND TRADEMARK OFFICE
CERTIFICATE OF CORRECTION

PATENT NO. : 5,160,370
DATED : November 3, 1992
INVENTOR(S) : Suga et al.

It is certified that error appears in the above-identified patent and that said Letters Patent is hereby corrected as shown below:

COLUMN 10:

Line 3, "mo/min" should read --ml/min--.

COLUMN 13:

Line 45, "mo/min" should read --ml/min--.

COLUMN 14:

Line 16, "mo/min" should read --ml/min--.

Signed and Sealed this

Sixteenth Day of November, 1993

Attest:

BRUCE LEHMAN

Attesting Officer

Commissioner of Patents and Trademarks